US008670366B2

(12) United States Patent  
Gou et al.

(10) Patent No.: US 8,670,366 B2
(45) Date of Patent: Mar. 11, 2014

(54) METHOD AND DEVICE FOR BEARING AND RECEIVING SCHEDULING INFORMATION OF MULTIMEDIA BROADCAST MULTICAST SERVICE (MBMS) CONTROL CHANNEL (MCCH) UPDATE INDICATION INFORMATION

(75) Inventors: Wei Gou, Shenzhen (CN); Zijiang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 244 days.

(21) Appl. No.: 13/257,702

(22) PCT Filed: Apr. 13, 2010

(86) PCT No.: PCT/CN2010/071744
§ 371 (c)(1),
(2), (4) Date: Sep. 30, 2011

(87) PCT Pub. No.: WO2010/118681
PCT Pub. Date: Oct. 21, 2010

(65) Prior Publication Data
US 2012/0008543 A1  Jan. 12, 2012

(30) Foreign Application Priority Data
Apr. 17, 2009 (CN) .......................... 2009 1 0133790

(51) Int. Cl.
*H04H 20/71* (2008.01)
*H04W 4/00* (2009.01)
*H04W 4/06* (2009.01)

(52) U.S. Cl.
CPC ............... *H04H 20/71* (2013.01); *H04W 4/005* (2013.01); *H04W 4/06* (2013.01)
USPC ........................... 370/312; 370/311; 370/313

(58) Field of Classification Search
CPC ....... H04W 4/06; H04W 76/08; H04W 72/01; H04W 72/005
USPC .......................................... 370/311, 312, 313
See application file for complete search history.

(56) References Cited

U.S. PATENT DOCUMENTS

2004/0202140 A1* 10/2004 Kim et al. ..................... 370/335
2006/0067361 A1*  3/2006 Lee et al. ..................... 370/466
(Continued)

FOREIGN PATENT DOCUMENTS

CN      1735231 A    2/2006
CN      1998164 A    7/2007
(Continued)

OTHER PUBLICATIONS

3GPP TSG-RAN WG2 Meeting #60bis R2-080205 Sevilla, Spain Jan. 14-18, 2008 Agenda item: 4.6.1.2 Source: Nokia Siemens Networks, Nokia Corporation Title: MCCH change notification pp. 1-3.*

(Continued)

Primary Examiner — Hassan Phillips
Assistant Examiner — Siren Wei
(74) Attorney, Agent, or Firm — Oppedahl Patent Law Firm LLC (57) ABSTRACT

The present invention discloses a method for bearing scheduling information of MCCH update indication information in a MBMS system, comprising: configuring the scheduling information of the MCCH update indication information in the MCCH or BCCH, wherein the scheduling information of the MCCH update indication information at least comprises information describing a sending rule of the MCCH update indication information. Meanwhile, the present invention discloses a method for receiving scheduling information of MCCH update indication information in the MBMS system, comprising: receiving a MCCH or BCCH, obtaining the scheduling information of the MCCH update indication information, and receiving the MCCH update indication information according to information describing a sending rule of the MCCH update indication information in the scheduling information of the MCCH update indication information. Meanwhile, the present invention discloses devices for implementing the methods above. The present invention only receives the MCCH when the information born in the MCCH is changed, without receiving information born in the MCCH at all times, to make the mobile terminals save more power.

9 Claims, 3 Drawing Sheets

(56) References Cited

U.S. PATENT DOCUMENTS

2007/0190997 A1* 8/2007 Moon et al. ............... 455/422.1
2009/0296645 A1* 12/2009 Bui .............................. 370/329

FOREIGN PATENT DOCUMENTS

| | | |
|---|---|---|
| CN | 100356804 C | 12/2007 |
| KR | 20060123422 A | 12/2006 |
| WO | 2006031020 A1 | 3/2006 |
| WO | 2008084634 A1 | 7/2008 |

OTHER PUBLICATIONS

Nokia Siemens Networks, Nokia Corporation Jan. 14-18, 2008.
Discussion on MCCH Update Notification Jan. 14-18, 2008.
International Search Report in international application No. PCT/CN2010/071744, mailed on Jul. 8, 2010.
English Translation of the Written Opinion of the International Search Authority in international application No. PCT/CN2010/071744, mailed on Jul. 8, 2010.
MCCH change notification Jan. 14-18, 2008.

\* cited by examiner

METHOD AND DEVICE FOR BEARING AND RECEIVING SCHEDULING INFORMATION OF MULTIMEDIA BROADCAST MULTICAST SERVICE (MBMS) CONTROL CHANNEL (MCCH) UPDATE INDICATION INFORMATION

TECHNICAL FIELD

The present invention relates to a technique for bearing and receiving scheduling information of Multimedia Broadcast Multicast Service (MBMS) Control Channel (MCCH) update indication information, and particularly to a method and device for bearing and receiving scheduling information of MCCH update indication information in a MBMS system.

BACKGROUND

With the rapid development of Internet and the popularization of large-screen multifunctional mobile terminals, there comes many mobile data multimedia services and various high-bandwidth multimedia services, such as video conference, television broadcast, video on demand, advertisement, online education and interactive game, is which meet the multi-service requirement of mobile subscribers and bring a new point of service growth for the mobile operators. These mobile data multimedia services require that multiple subscribers can receive the same data simultaneously, with the characteristics of large data size, long duration, sensitive time delay and the like, compared with the normal data services.

To effectively utilize the resources of mobile networks, the $3^{rd}$ Generation Partnership Project (3GPP) puts forward the MBMS which is a technique to transmit data from a data source to multiple destination mobile terminals, thereby realizing the resource sharing of networks, comprising core network and access network, and improving the utility ratio of network resources, especially air interface resources. The MBMS defined by the 3GPP not only can realize the plaintext and low-speed message multicast and broadcast, but also can realize the broadcast and multicast of high-speed multimedia services, to provide plentiful video, audio and multimedia services. This definitely accommodates the future development trend of mobile data and provides a better service prospect for the development of $3^{rd}$ Generation (3G).

The characteristics of the MBMS are large data size of service, long duration of reception of mobile terminals and constant average data rate, which determine that the MBMS system is semi-static of scheduling services and configuring control signalling, i.e., the MBMS service is constant in the scheduling information and control signalling information for a long term, so that each periodic system in the MCCH sends an constant information; and the sending is constant because it is possible that new subscribers will access the MBMS system any time. Therefore, it is unnecessary for a mobile terminal which has received the MCCH to receive a constant MCCH each time, and the constant reception of MCCH will waste power because the reception and parsing processes are comparatively power-consumed, owing to the large amount of information of MCCH. In light of this, it is proposed to increase MCCH update indication information in the MBMS system to describe whether the MCCH is changed or not by using a small amount of information, and the access mobile terminals which has received the MCCH service only need to receive the MCCH update indication information with a small amount of information and determine whether to receive the MCCH or not.

In a Long Term Evolution (LTE) system, the sending of MCCH update indication information is not yet completely discussed. But it is not desired to introduce a dedicated physical channel for the sending of the MCCH and the sending of the MCCH update indication information in the LTE, whereas the functions of the MCCH update indication information should be reserved. There is no fixed physical channel, so it is required to configure physical resources for the MCCH update indication information, and still to send the scheduling information of the MCCH update indication information to mobile terminals for receiving the MCCH update indication information. Because the way of sending the MCCH update indication information is still in discussion, the way of sending the scheduling information of the MCCH update indication information is undetermined.

SUMMARY

In view of this, the present invention mainly aims to provide a method and device for bearing and receiving scheduling information of MCCH update indication information to make mobile terminals obtain the scheduling information of the MCCH update indication information quickly so as to receive the MCCH update indication information.

To achieve the objective above, the technical solution of the present invention is realized by the following.

A method for bearing scheduling information of MCCH update indication information comprises:

bearing the scheduling information of the MCCH update indication information in a MCCH or BCCH, and sending the scheduling information.

Preferably, the scheduling information of the MCCH update indication information may at least comprise sending rule information of the MCCH update indication information.

Preferably, the sending rule of the MCCH update indication information may comprise: information of a sending period of the MCCH update indication information and a start radio frame including the MCCH update indication information.

Preferably, the sending rule of the MCCH update indication information may further comprise: information of subframes including the MCCH update indication information.

Preferably, the method may further comprise:

indicating the information of the subframes including the MCCH update indication information by indicating subframe number.

Preferably, the scheduling information of the MCCH update indication information may further comprise control information of the MCCH update indication information.

Preferably, the information of the sending period and/or start radio frame of the MCCH update indication information may be impliedly sent by a sending period or modifying period of the MCCH.

Preferably, the step that the information of the sending period and/or start radio frame of the MCCH update indication information are/is impliedly sent by the sending period or modifying period of the MCCH may comprise:

setting a multiple relationship between the sending period of the MCCH update indication information and the sending period or modifying period of the MCCH, wherein the multiple is sent by bearing in the MCCH or BCCH, or configured to be a fixed value by a protocol.

A method for receiving scheduling information of MCCH update indication information comprises:

receiving information born in a MCCH or BCCH, obtaining the scheduling information of the MCCH update indication information, and receiving the MCCH update indication information according to sending rule information of the MCCH update indication information in the scheduling information of the MCCH update indication information.

Preferably, the reception of the MCCH update indication information may specifically comprise:

when the scheduling information of the MCCH update indication information only comprises information of radio frames including the MCCH update indication information, receiving and retrieving control domains of all subframes in the radio frames including the MCCH update indication information one by one until control information of the MCCH update indication information is obtained, and obtaining the MCCH update indication information included in data domains of the subframes according to the control information of the MCCH update indication information;

when the scheduling information of the MCCH update indication information only comprises information of subframes including the MCCH update indication information, according to the information of subframes, receiving and retrieving control domains of the subframes in each radio frame one by one until control information of the MCCH update indication information is obtained, and obtaining the MCCH update indication information included in data domains of the subframes according to the control information of the MCCH update indication information;

when the scheduling information of the MCCH update indication information comprises information of radio frames including the MCCH update indication information, and further comprises information of specific subframes including the MCCH update indication information, receiving and retrieving control domains of the subframes in the radio frames including the MCCH update indication information, obtaining control information of the MCCH update indication information, and obtaining the MCCH update indication information included in data domains of the subframes according to the control information of the MCCH update indication information;

when the scheduling information of the MCCH update indication information comprises information of radio frames including the MCCH update indication information, and further comprises control information of the MCCH update indication information, receiving, decoding and determining data in time frequency resources, indicated by the control information, in data domains of all subframes in the radio frames including the MCCH update indication information one by one until the MCCH update indication information is obtained;

when the scheduling information of the MCCH update indication information comprises information of subframes including the MCCH update indication information, and further comprises control information of the MCCH update indication information, receiving, decoding and determining data in time frequency resources, indicated by the control information, in data domains of the subframes in each radio frame until the MCCH update indication information is obtained; and when the scheduling information of the MCCH update indication information comprises information of radio frames and subframes including the MCCH update indication information, and further comprises control information of the MCCH update indication information, receiving the MCCH update indication information in data domains of the subframes in the radio frames including the MCCH update indication information according to the information of the radio frames and subframes and the control information of the MCCH update indication information.

A device for bearing scheduling information of MCCH update indication information comprises:

a setting unit, used for setting the scheduling information of the MCCH update indication information;

a bearing unit, used for configuring the scheduling information of the MCCH update indication information in a MCCH or BCCH; and a sending unit, used for sending information born in the MCCH or BCCH.

Preferably, the scheduling information of the MCCH update indication information may at least comprise sending rule information of the MCCH update indication information, and the sending rule information of the MCCH update indication information may comprise: information of a sending period of the MCCH update indication information, and a start radio frame including the MCCH update indication information.

Preferably, the sending rule of the MCCH update indication information may further comprise information of subframes including the MCCH update indication information.

Preferably, the scheduling information of MCCH update indication information may further comprise control information of the MCCH update indication information.

A device for receiving scheduling information of MCCH update indication information comprises:

a first receiving unit, used for receiving information born in a MCCH or BCCH, and obtaining the scheduling information of the MCCH update indication information; and a second receiving unit, used for further receiving the MCCH update indication information according to sending rule information of the MCCH update indication information in the scheduling information of the MCCH update indication information.

Preferably, the operation that the second receiving unit receives the MCCH update indication information may specifically be:

when the scheduling information of the MCCH update indication information only comprises information of radio frames including the MCCH update indication information, receiving and retrieving control domains of all subframes in the radio frames including the MCCH update indication information one by one until control information of the MCCH update indication information is obtained, and obtaining the MCCH update indication information included in data domains of the subframes according to the control information of the MCCH update indication information;

when the scheduling information of the MCCH update indication information only comprises information of subframes including the MCCH update indication information, according to the information of subframes, receiving and retrieving control domains of the subframes in each radio frame one by one until control information of the MCCH update indication information is obtained, and obtaining the MCCH update indication information included in data domains of the subframes according to the control information of the MCCH update indication information;

when the scheduling information of the MCCH update indication information comprises information of radio frames bearing the MCCH update indication information, and further comprises information of specific subframes bearing the MCCH update indication information, receiving and retrieving control domains of the subframes in the radio frames including the MCCH update indication information, obtaining control information of the MCCH update indication information, and obtaining the MCCH update indication information included in data domains of the subframes according to the control information of the MCCH update indication information;

when the scheduling information of the MCCH update indication information comprises information of radio frames including the MCCH update indication information, and further comprises control information of the MCCH update indication information, receiving, decoding and determining data in time frequency resources, indicated by the control information, in data domains of all subframes in the radio frames including the MCCH update indication information one by one until the MCCH update indication information is obtained;

when the scheduling information of the MCCH update indication information comprises information of subframes including the MCCH update indication information, and further comprises control information of the MCCH update indication information, receiving, decoding and determining data in time frequency resources, indicated by the control information, in data domains of the subframes in each radio frame until the MCCH update indication information is obtained; and when the scheduling information of the MCCH update indication information comprises information of radio frames and subframes including the MCCH update indication information, and further comprises control information of the MCCH update indication information, receiving the MCCH update indication information in data domains of the subframes in the radio frames including the MCCH update indication information according to the information of the radio frames and subframes and the control information of the MCCH update indication information.

The present invention indicates the time frequency resources including the MCCH update indication information by setting the scheduling information of the MCCH update indication information, so that the mobile terminals receive the MCCH update indication information in the indicated time frequency resources. The scheduling information of is the MCCH update indication information of the present invention is born in the MCCH or Broadcast Control Channel (BCCH), and because the MCCH or BCCH bears public information, the mobile terminals, after receiving information born in the MCCH or BCCH, can obtain the information of the time frequency resources of the MCCH update indication information, thereby receiving the MCCH update indication information, so the mobile terminals only receive the information born in the MCCH when the information born in the MCCH is changed, without receiving the MCCH or BCCH bearing more information at all times, to save more power.

DETAILED DESCRIPTION

The basic idea of the present invention is to bear the scheduling information of MCCH update indication information by the MCCH or BCCH, in which the scheduling information of the MCCH update indication information at least comprises sending rule information of the MCCH update indication information, and the sending rule describes the position information of the time frequency resources bearing the MCCH update indication information to help mobile terminals find and receive the MCCH update indication information. Here, an example of the sending rule is provided, in which the sending rule information specifies which radio frames or subframes include the MCCH update indication information, or specifies the sending period of the MCCH update indication information, and the start position information of the period and the like, to help mobile terminals find the accurate information, such as sending time and time frequency resources, of the MCCH update indication information after mobile terminals receive information born in the MCCH or BCCH, thereby preparing for receiving the MCCH update indication information by the mobile terminals. By doing so, the mobile terminals only receive the MCCH when the information in the MCCH is changed to save more power.

The present invention is explained below in detail with reference to the embodiments and accompanying drawings to more clearly show the objective, technical solution and advantages of the present invention.

Figure 1:
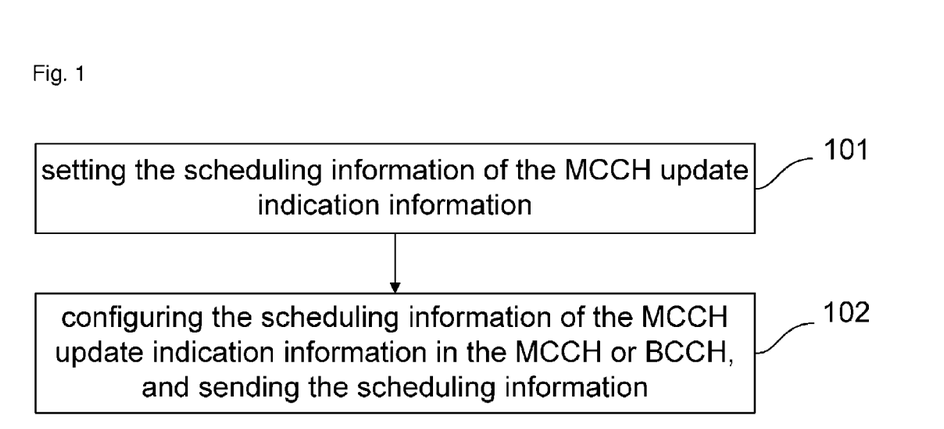
FIG. 1 shows a flowchart of embodiment 1 of a method for bearing scheduling information of MCCH update indication information in the MBMS system of the present invention.

FIG. 1 shows a flowchart of a method for bearing scheduling information of MCCH update indication information in the MBMS system of the present invention. As shown in FIG. 1, the method comprises the following steps.

Step 101: setting the scheduling information of the MCCH update indication information.

The scheduling information of the MCCH update indication information at least comprises sending rule information of the MCCH update indication information. Here, the scheduling information of the MCCH update indication information only comprises the sending rule information of the MCCH update indication information, and the mobile terminals can find which radio frames or subframes include the MCCH update indication information according to the sending rule. The time frequency resources including the MCCH update indication information are determined by the MBMS network side, but the including way is the only certainty. The scheduling information of the MCCH update indication information of the present invention notifies the mobile terminals of the appearance rule of the resources including the MCCH update indication information. There are various ways to describe the sending rule of the MCCH update indication information. For example, when the MBMS network side prescribes that the MCCH update indication information is sent according to a period, the scheduling information of the MCCH update indication information comprises the information of the period and start position of radio frames including the MCCH update indication information, in which the information of the start position is which radio frame includes the MCCH update indication information in the sending period. The specific formula is: SFN mod period=offset, where SFN (system frame number) is the system radio frame number ranging from 0 to 1023 in the LTE system, mod is modular arithmetic, period is the sending period of the MCCH update indication information, and offset is the information of the start radio frame of the sending period of the MCCH update indication information, representing the offset of the start radio frame relative to the radio frame with SFN=0. The measure unit of the information of the sending period and start radio frame may be the radio frame or time.

Taking that the sending period is 10 radio frames as an example, the SFN of start radio frame including the MCCH update indication information is 3, then the third radio frame is the one including the MCCH update indication information in every 10 radio frames (from the radio frame with SFN=0). The formula is SFN mod 10=2, that is, any radio frame corresponding to the SFN meeting the formula is the one including the MCCH update indication information. In this example, the measure unit is the radio frame. The mobile terminals perform modular arithmetic of the received radio frames with 10 according to the radio frame number, and those having the modular value of 2 are the radio frames including the MCCH update indication information. It is complicated to receive and retrieve all subframes in the whole radio frames by the mobile terminals to obtain the MCCH update indication information due to the relatively large range of the radio frames, so it would be better to notify the mobile terminals of the information of the subframes including the MCCH update indication information. Several methods for indicating the subframes provided here can directly notify the mobile terminals of the subframe number in the radio frames. Each radio frame has 10 subframes with the numbers of 0 to 9 described by the decimal numbers corresponding to binary 4 bit. For example, "0000" represents subframe 0 including the MCCH update indication information, "0011" represents subframe 3 including the MCCH update indication information, and so forth. A bitmap may also indicate which subframe includes the MCCH update indication information, that is, a subframe including the MCCH update indication information is described by 10 bit. For example, "0100000000" may indicate that subframe 1 includes the MCCH update indication information. Therefore, the scheduling information of the MCCH update indication information at least comprises information of the sending period of radio frames (the radio frame as unit for description) including the MCCH update indication information, the start radio frame of the sending period of the radio frames including the MCCH update indication information, and the information of specific subframes including the MCCH update indication information in the radio frames including the MCCH update indication information.

Step 102: configuring the scheduling information of the MCCH update indication information in the MCCH or BCCH, and sending the scheduling information.

In this example, it is only necessary to bear the scheduling information of MCCH update indication information in the MCCH, i.e., to configure the scheduling information of the MCCH update indication information in the MCCH. A dedicated Information Element (IE) item for the scheduling information of the MCCH update indication information in the MCCH may be set, or an IE item is shared by the scheduling information of the MCCH update indication information with other information in the MCCH.

The scheduling information of the MCCH update indication information may be born in the BCCH. A dedicated IE item for scheduling information of the MCCH update indication information in the BCCH may be set, or an IE item is shared by the scheduling information of the MCCH update indication information with other information in the BCCH.

The information of the start radio frame of the sending period of radio frames including the MCCH update indication information is born in the MCCH or BCCH, the scheduling information of the MCCH update indication information is sent to the mobile terminals by sending the MCCH or BCCH. Here, the information of the start radio frame of the sending period of radio frames including the MCCH update indication information may also be impliedly sent by other parameters. For example, the above-mentioned period may be implied by the sending period of the MCCH or modifying period of the MCCH, or by establishing a multiple relationship between the above-mentioned period and the sending period of the MCCH or the modifying period of the MCCH, wherein the multiple which is taken as the scheduling information of the MCCH update indication information is born in the MCCH or BCCH, or fixed by a protocol. The above-mentioned offset may be implied by the sending offset of the sending period of the MCCH or the sending offset of the modifying period of the MCCH, in which the above-mentioned offset may be equal to the sending offsets of the sending period of the MCCH or the sending offset of the modifying period of the MCCH, or a certain mapping relationship between them is established, wherein the mapping relationship which is taken as the scheduling information of the MCCH update indication information is born in the MCCH or BCCH, or fixed by a protocol.

Figure 2:
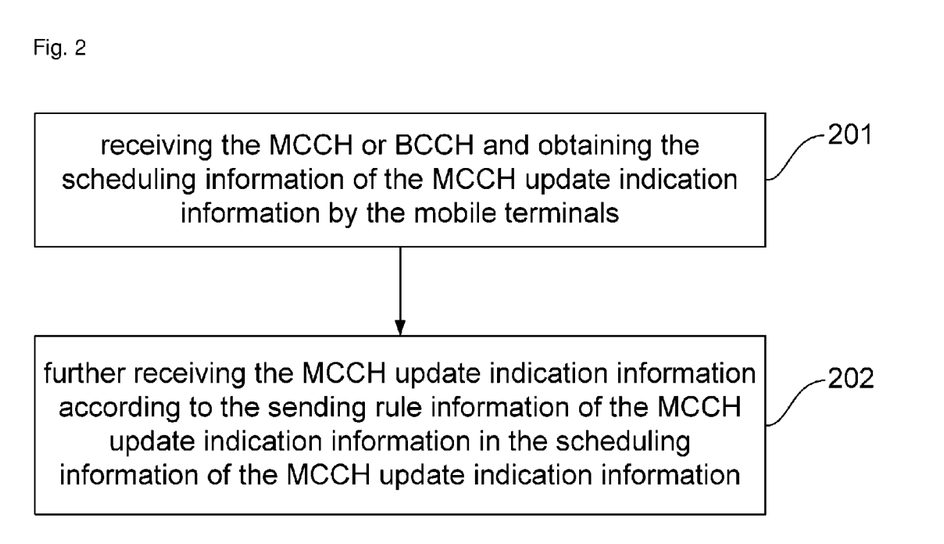
FIG. 2 shows a flowchart of embodiment 1 of a method for receiving scheduling information of MCCH update indication information in the MBMS system of the present invention.

FIG. 2 shows a flowchart of embodiment 1 of a method for receiving scheduling information of MCCH update indication information in the MBMS system of the present invention. As shown in FIG. 2, according to the scheduling information of the MCCH update indication information in FIG. 1, the method comprises the following steps.

Step 201: receiving information born in the MCCH or BCCH and obtaining the scheduling information of MCCH update indication information by the mobile terminals.

After receiving the information born in the MCCH or BCCH, the mobile terminals parse the information born in the MCCH or BCCH to obtain the scheduling information of the MCCH update indication information born in the MCCH, thereby finding which radio frames or subframes include the MCCH update indication information.

Step 202: further receiving the MCCH update indication information according to the sending rule information of the MCCH update indication information in the scheduling information of the MCCH update indication information.

The mobile terminals may further receive the MCCH update indication information in the following ways.

when the scheduling information of the MCCH update indication information only comprises the information of the radio frames including the MCCH update indication information, the control domains of all subframes in the radio frames including the MCCH update indication information are received and retrieved one by one until the control information of the MCCH update indication information is obtained in control domain of a certain subframe, and the MCCH update indication information born in data domain of the subframe is obtained according to the time frequency resources including the MCCH update indication information, indicated by the control information of the MCCH update indication information.

When the scheduling information of the MCCH update indication information only comprises indications that which radio frames include the MCCH update indication information, specifically, the equation, SFN mod period=offset, is used to describe which radio frames include the MCCH update indication information, and the information of two parameters, period and offset, is directly comprised in the scheduling information of the MCCH update indication information. As described in Step 102, period may be impliedly sent by the sending period of the MCCH or modifying period of the MCCH, and offset can be impliedly sent by the sending offset of the sending period of the MCCH or the sending offset of the modifying period of the MCCH.

The mobile terminals retrieve the control domains of all subframes in the radio frames including the MCCH update indication information. Because the Radio Network Temporary Identifier (RNTI) identifying the control information of the MCCH update indication information is available in the control information of the MCCH update indication information, whether each piece of complete control information in the control domains is the control information of the MCCH update indication information can be determined by blind detection of the RNTI in the complete control information. For details, refer to the LTE protocol 36.212. Until the correct control information of the MCCH update indication information is received, upon the received control information of the MCCH update indication information, the MCCH update indication information is received in the data domains of the subframes and parsed. The RNTI is configured by the network side, and impliedly included in the Cyclic Redundancy Check (CRC) code of the control information of the MCCH update indication information when the control information of the MCCH update indication information is generated. For details, refer to the LTE protocol 36.212. Therefore, the control information of the MCCH update indication information can be determined by the RNTI. In this example, the RNTI of the MCCH update indication information is preconfigured. The control information of the MCCH update indication information is configured and sent in the control domains of the subframes including the MCCH update indication information.

When the scheduling information of the MCCH update indication information only comprises indications that which subframes include the MCCH update indication information, the mobile terminals retrieve the control domains of the subframes, in each radio frame, possibly including the MCCH update indication information. Because the RNTI identifying the control information of the MCCH update indication information is available in the control information of the MCCH update indication information, whether each piece of complete control information in the control domains is the control information of the MCCH update indication information can be determined by blind detection of the RNTI in the complete control information. For details, refer to the LTE protocol 36.212. Until the correct control information of the MCCH update indication information is received, upon the received control information of the MCCH update indication information, the MCCH update indication information is received in the data domains of the subframes and parsed. The RNTI is configured by the network side, and impliedly included in the CRC code of the control information of the MCCH update indication information when the control information of the MCCH update indication information is generated. For details, refer to the LTE protocol 36.212. Therefore, the control information of the MCCH update indication information can be determined by the RNTI. In this example, the RNTI of the MCCH update indication information is preconfigured. The control information of the MCCH update indication information is configured and sent in the control domains of the subframes including the MCCH update indication information.

When the scheduling information of the MCCH update indication information comprises the information of the radio frames including the MCCH update indication information, and further comprises the information of the specific subframes including the MCCH update indication information, the control domains of the subframes in the radio frames including the MCCH update indication information are received and retrieved, the control information of the MCCH update indication information is obtained in the indicated control domains of specific subframes in the radio frames, and the MCCH update indication information included in the data domains of the subframes is obtained according to the control information of the MCCH update indication information.

When the scheduling information of the MCCH update indication information only comprises indications that which radio frames include the MCCH update indication information, and further comprises the specific subframes including the MCCH update indication information, which radio frames include the MCCH update indication information, for example, is described by SFN mod period=offset, and the information of the specific subframes including the MCCH update indication information in these radio frames including the MCCH update indication information is further described by the method for notifying the mobile terminals of the subframe number. Thus, the information of two parameters, period and offset, and the number information of specific subframes including the MCCH update indication information in these radio frames are directly comprised in the scheduling information of the MCCH update indication information. It should be noted that, the specific parameters herein may be impliedly given by other parameters. For example, "period" may be implied by the sending period of the MCCH or modifying period of the MCCH, or by establishing a multiple relationship between "period" and the sending period of the MCCH or the modifying period of the MCCH, wherein the multiple which is taken as the scheduling information of the MCCH update indication information is born in the MCCH or BCCH, or fixed by a protocol. For example, "offset" may be implied by the sending offset of the sending is period of the MCCH or the sending offset of the modifying period of the MCCH, in which "offset" may be equal to the sending offset of the sending period of the MCCH or the sending offset of the modifying period of the MCCH, or by establishing a certain mapping relationship between them, wherein the mapping relationship which is taken as the scheduling information of the MCCH update indication information is born in the MCCH or BCCH, or fixed by a protocol. For example, the information of the specific subframes including the MCCH update indication information can be fixed, e.g., subframe 0 in the radio frames. The mobile terminals retrieve the control domains of the subframes including the MCCH update indication information in the radio frames including the MCCH update indication information. Because the RNTI identifying the control information of the MCCH update indication information is available in the control information of the MCCH update indication information, whether each piece of complete control information in the control domain is the control information of the MCCH update indication information can be determined by blind detection of the RNTI in the complete control information. For details, refer to the LTE protocol 36.212. After the correct control information of the MCCH update indication information is received, upon the received control information of the MCCH update indication information, the MCCH update indication information is received in the data domains of the subframes and parsed.

Figure 3:
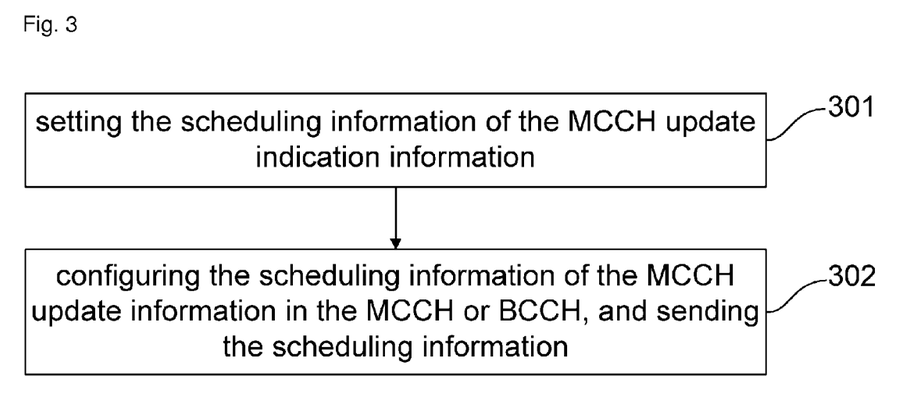
FIG. 3 shows a flowchart of embodiment 2 of a method for bearing scheduling information of MCCH update indication information in the MBMS system of the present invention.

FIG. 3 shows a flowchart of embodiment 2 of a method for bearing scheduling information of MCCH update indication information in the MBMS system of the present invention. As shown in FIG. 3, the method comprises the following steps.

Step 301: setting the scheduling information of the MCCH update indication information.

The scheduling information of the MCCH update indication information at least comprises sending rule information of the MCCH update indication information. Compared with Step 101 in FIG. 1, in Step 301, the scheduling information of the MCCH update indication information further comprises the control information of the MCCH update indication information, which describes the specific information of time frequency resources of the MCCH update indication information in the subframes, and the information of the modulation and coding scheme (MCS) used for the MCCH update indication information. The mobile terminals can receive the MCCH update indication information in the corresponding time frequency resources directly, after receiving the control information of the MCCH update indication information.

Step 302: configuring and sending the scheduling information of the MCCH update indication information in the MCCH or BCCH.

In this example, it is only necessary to bear the scheduling information of the MCCH update indication information in the MCCH, i.e., to configure the scheduling information of the MCCH update indication information in the control domain of the MCCH. A dedicated IE item for scheduling information of MCCH update indication information in the MCCH may be set, or an IE item is shared by the scheduling information of the MCCH update indication information with other information in the MCCH The specific bearing and sending ways, refer to the corresponding description in Step 102, thus it is not repeated here.

The scheduling information of MCCH update indication information may be born in the BCCH.

Figure 4:
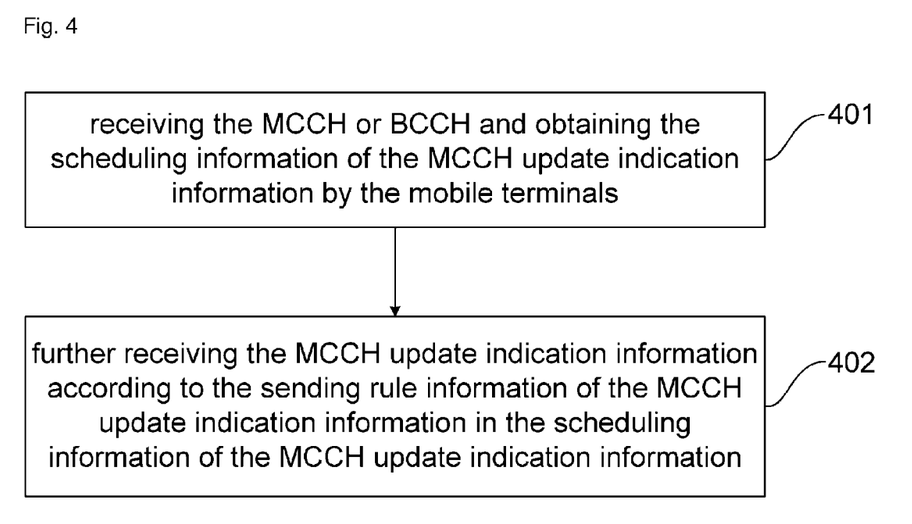
FIG. 4 shows a flowchart of embodiment 2 of a method for receiving scheduling information of MCCH update indication information in the MBMS system of the present invention.

FIG. 4 shows a flowchart of embodiment 2 of a method for receiving scheduling information of MCCH update indication information in the MBMS system of the present invention. As shown in FIG. 4, according to the scheduling information of the MCCH update indication information in FIG. 3, the method comprises the following steps.

Step 401: receiving the MCCH or BCCH and obtaining the scheduling information of the MCCH update indication information by the mobile terminals.

after receiving information born in the MCCH or BCCH, the mobile terminals parse the control information of the MBMS service in the control domain of the MCCH or BCCH to obtain the scheduling information of the MCCH update indication information, thereby finding that which time frequency resources of radio frames or subframes include the MCCH update indication information, and the MCS information used for coding the MCCH update indication information, according to the information of the radio frames or subframes including the MCCH update indication information and the control information of the MCCH update indication information in the scheduling information.

Step 402: further receiving the MCCH update indication information according to the sending rule information of the MCCH update indication information in the scheduling information of the MCCH update indication information.

The mobile terminals may further receive the MCCH update indication information in the following ways.

when the scheduling information of the MCCH update indication information comprises the information of the radio frames including the MCCH update indication information, and further comprises the control information of the MCCH update indication information, data in the time frequency resources, indicated by the control information, in the data domains of all subframes in the radio frames including the MCCH update indication information is received, decoded and determined one by one until the MCCH update indication information is obtained. Here, the way for obtaining the information of the radio frames including the MCCH update indication information is identical to that in Step 202. After the determination of the radio frames, according to the control information of the MCCH update indication information, the data in the time frequency resources indicated by the control information of all subframes in the radio frames is received, parsed and decoded, and whether the parsed data is the MCCH update indication information is determined by the CRC in the decoded data, until the correct MCCH update indication information is obtained. If the CRC shows that the decoding is correct, the received data is the MCCH update indication information.

When the scheduling information of the MCCH update indication information comprises the information of the subframes including the MCCH update indication information, and further comprises the control information of the MCCH update indication information, data in the time frequency resources, indicated by the control information, in the data domains of the subframes in each radio frame is received, decoded and determined until the control information of the MCCH update indication information is obtained. Here, the way for obtaining the information of subframes including the MCCH update indication information is identical to that in Step 202. After the determination of the subframes including the MCCH update indication information, according to the control information of the MCCH update indication information, the data in the time frequency resources indicated by the control information of the indicated subframe in each radio frame is received, parsed and decoded, and whether the parsed data is the MCCH update indication information is determined by the CRC in the decoded data, until the correct MCCH update indication information is obtained. If the CRC shows that the decoding is correct, the received data is the MCCH update indication information.

When the scheduling information of the MCCH update indication information comprises the information of the radio frames and subframes including the MCCH update indication information, and further comprises the control information of the MCCH update indication information, the MCCH update indication information in the is data domains, indicated by the control information, of the subframes in the radio frames including the MCCH update indication information is received according to the information of the radio frames and subframes and the control information of the MCCH update indication information. Here, the way for obtaining the information of radio frames and subframes including the MCCH update indication information is identical to that in Step 202. After the determination of the radio frames and subframes including the MCCH update indication information, the MCCH update indication information can be determined uniquely according to the control information thereof, so it can be directly received and decoded.

Figure 5:
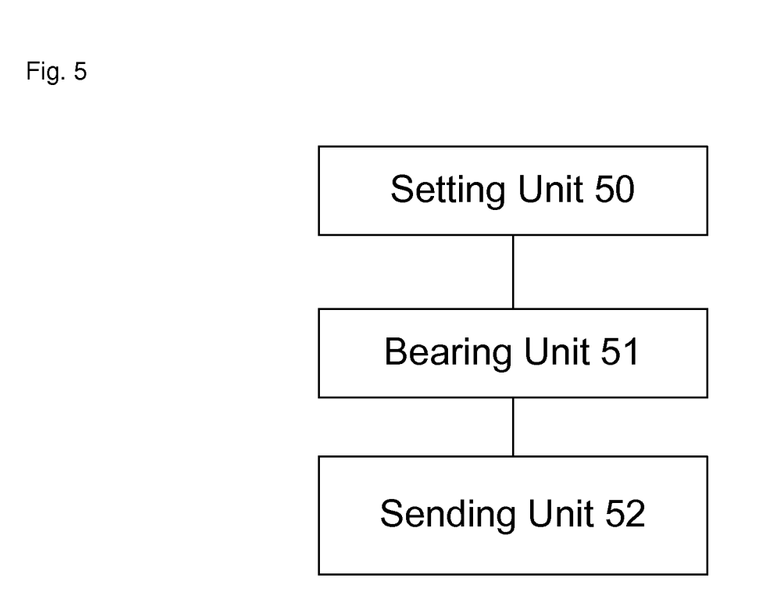
FIG. 5 shows a structural diagram of a device for bearing scheduling information of MCCH update indication information in the MBMS system of the present invention.

FIG. 5 shows a structural diagram of a device for including scheduling information of MCCH update indication information in the MBMS system of the present invention. As shown in FIG. 5, the device comprises a setting unit 50, a bearing unit 51, and a sending unit 52, wherein the setting unit 50 is used for setting the scheduling information of the MCCH update indication information, which at least comprises the sending rule information of the MCCH update indication information. The sending rule of the MCCH update indication information comprises: information of the sending period of the MCCH update indication information, the start radio frame including the MCCH update indication information, and preferably, the subframes including the MCCH update indication information. The scheduling information of MCCH update indication information further comprises control information of the MCCH update indication information. The bearing unit 51 is used for configuring the scheduling information of the MCCH update indication information in the MCCH or BCCH. The sending unit 52 is used for sending information born in the MCCH or BCCH.

Those skilled in the art shall understand that the device for bearing the scheduling information of the MCCH update indication information in the MBMS system illustrated in FIG. 5 of the present invention is designed to implement the method for bearing the scheduling information of the MCCH update indication information in the MBMS system illustrated in FIGS. 1 and 3, and the function of each processing unit inside can be understood as the corresponding description in the methods illustrated in FIGS. 1 and 3 and can be realized by running the programs of processors, or the corresponding logic circuits.

Figure 6:
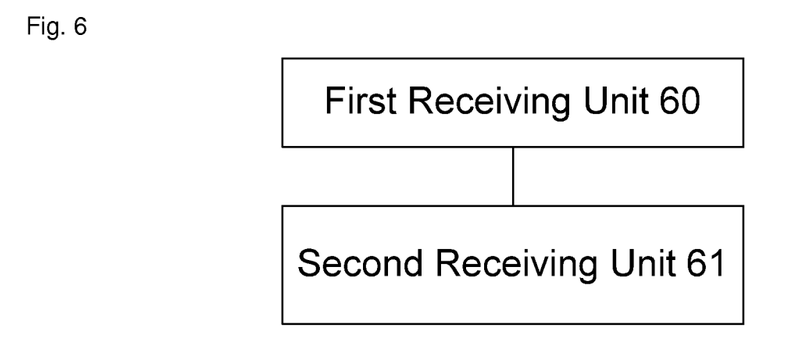
FIG. 6 shows a structural diagram of a device for receiving scheduling information of MCCH update indication information in the MBMS system of the present invention.

FIG. 6 shows a structural diagram of a device for receiving scheduling information of MCCH update indication information in the MBMS system of the present invention. As shown in FIG. 6, the device comprises a first receiving unit 60 and a second receiving unit 61, wherein the first receiving unit 60 is used for receiving information born in the MCCH or BCCH and obtaining the scheduling information of the MCCH update indication information. Here, the scheduling information of the MCCH update indication information is the same as that illustrated in FIGS. 1 and 3. The second receiving unit 61 is used for further receiving the MCCH update indication information according to the sending rule information of the MCCH update indication information in the scheduling information of the MCCH update indication information. The reception of the MCCH update indication information by the second receiving unit 61 specifically is: when the scheduling information of the MCCH update indication information only comprises the information of the radio frames including the MCCH update indication information, receiving and retrieving the control domains of all subframes in the radio frames bearing the MCCH update indication information one by one until the control information of the MCCH update indication information is obtained, and obtaining the MCCH update indication information included in the data domains of the subframes according to the control information of the MCCH update indication information; when the scheduling information of the MCCH update indication information only comprises the information of the subframes including the MCCH update indication information, according to the information of subframes, receiving and retrieving the control domains of the subframes in each radio frame one by one until the control information of the MCCH update indication information is obtained, and obtaining the MCCH update indication information included in the data domains of the subframes according to the control information of the MCCH update indication information; when the scheduling information of the MCCH update indication information comprises the information of the radio frames including the MCCH update indication information, and further comprises the information of the specific subframes including the MCCH update indication information, receiving and retrieving the control domains of the subframes in the radio frames including the MCCH update indication information, obtaining the control information of the MCCH update indication information, and obtaining the MCCH update indication information included in the data domains of the subframes according to the control information of the MCCH update indication information; when the scheduling information of the MCCH update indication information comprises the information of the radio frames including the MCCH update indication information, and further comprises the control information of the MCCH update indication information, data in the time frequency resources, indicated by the control information, in the data domains of all subframes in the radio frames including the MCCH update indication information is received, decoded and determined one by one until the MCCH update indication information is obtained; when the scheduling information of the MCCH update indication information comprises the information of the subframes including the MCCH update indication information, and further comprises the control information of the MCCH update indication information, data in the time frequency resources, indicated by the control information, in the data domains of the subframes in each radio frame is received, decoded and determined until the control information of the MCCH update indication information is obtained; and when the scheduling information of the MCCH update indication information comprises the information of the radio frames and subframes including the MCCH update indication information, and further comprises the control information of the MCCH update indication information, the MCCH update indication information in the data domains of the subframes in the radio frames including the MCCH update indication information is received according to the information of the radio frames, the information of subframes and the control information of the MCCH update indication information.

The device for receiving the scheduling information of the MCCH update indication information in the MBMS system illustrated in FIG. 6 may be used in conjunction with the device for bearing the scheduling information of the MCCH update indication information in the MBMS system illustrated in FIG. 5.

Those skilled in the art shall understand that the device for receiving the scheduling information of the MCCH update indication information in the MBMS system illustrated in FIG. 6 of the present invention is designed to implement the method for receiving the scheduling information of the MCCH update indication information in the MBMS system illustrated in FIGS. 2 and 4, and the function of each processing unit inside can be understood as the corresponding description in the methods illustrated in FIGS. 2 and 4 and can be realized by running the programs of processors, or the corresponding logic circuits.

The described above are only preferred embodiments of the present invention, and not intended to limit the protection scope of the present invention.

The invention claimed is:
1. A method for bearing scheduling information of MCCH update indication information, comprising:
   bearing the scheduling information of the MCCH update indication information in a BCCH, and sending the scheduling information,
   wherein the MCCH update indication information is used for indicating whether information born in an MCCH during a next modification period of the MCCH is updated or not,
   wherein the scheduling information of the MCCH update indication information comprises: a multiple, information of a start radio frame of a sending period of the MCCH update indication information, and information of a subframe of the sending period of the MCCH update indication information, wherein (the multiple)×(the sending period of the MCCH update indication information)=a modification period of the MCCH, wherein a system frame number (SFN) of a radio frame carrying the MCCH update indication information is determined by the following formula:

SFN mod (the modification period of the MCCH/the multiple)=offset, where the offset is information of the start radio frame of the sending period of the MCCH update indication information, representing the offset of the start radio frame relative to a radio frame numbering 0.

2. The method according to claim 1, further comprising: indicating the information of the subframe including the MCCH update indication information by indicating subframe number.

3. The method according to claim 1, wherein the scheduling information of the MCCH update indication information further comprises control information of the MCCH update indication information.

4. A method for receiving scheduling information of MCCH update indication information, comprising:

receiving BCCH, obtaining the scheduling information of the MCCH update indication information born in the BCCH, and receiving the MCCH update indication information according to the scheduling information of the MCCH update indication information, wherein the MCCH update indication information is used for indicating whether information born in an MCCH during a next modification period of the MCCH is updated or not, wherein the scheduling information of the MCCH update indication information comprises: a multiple, information of a start radio frame of a sending period of the MCCH update indication information, and information of a subframe of the sending period of the MCCH update indication information, wherein (the multiple)×(the sending period of the MCCH update indication information)=a modification period of the MCCH, wherein a system frame number (SFN) of a radio frame carrying the MCCH update indication information is determined by the following formula:

SFN mod (the modification period of the MCCH/the multiple)=offset, where the offset is information of the start radio frame of the sending period of the MCCH update indication information, representing the offset of the start radio frame relative to a radio frame numbering 0, wherein the receiving the MCCH update indication information comprises:

receiving and retrieving control domains of the subframes in the radio frames including the MCCH update indication information.

5. The method according to claim 4, further comprising: after the control domains are received and retrieved, obtaining control information of the MCCH update indication information, and obtaining the MCCH update indication information included in data domains of the subframes according to the control information of the MCCH update indication information.

6. A device for bearing scheduling information of MCCH update indication information, comprising: a setting unit, a bearing unit and a sending unit, wherein the setting unit is used for setting the scheduling information of the MCCH update indication information;

the bearing unit is used for configuring the scheduling information of the MCCH update indication information in a BCCH; and the sending unit is used for sending information born in the BCCH, wherein the MCCH update indication information is used for indicating whether information born in an MCCH during a next modification period of the MCCH is updated or not, wherein the scheduling information of the MCCH update indication information comprises: a multiple, information of a start radio frame of a sending period of the MCCH update indication information, and information of a subframe of the sending period of the MCCH update indication information, wherein (the multiple)×(the sending period of the MCCH update indication information)=a modification period of the MCCH, wherein a system frame number (SFN) of a radio frame carrying the MCCH update indication information is determined by the following formula:

SFN mod (the modification period of the MCCH/the multiple)=offset, where the offset is information of the start radio frame of the sending period of the MCCH update indication information, representing the offset of the start radio frame relative to a radio frame numbering 0.

7. The device according to claim 6, wherein the scheduling information of the MCCH update indication information further comprises control information of the MCCH update indication information.

8. A device for receiving scheduling information of MCCH update indication information, comprising: a first receiving unit and a second receiving unit, wherein the first receiving unit is used for receiving a BCCH, and obtaining the scheduling information of the MCCH update indication information born in the BCCH; and the second receiving unit is used for further receiving the MCCH update indication information according to the scheduling information of the MCCH update indication information, wherein the MCCH update indication information is used for indicating whether information born in an MCCH during a next modification period of the MCCH is updated or not, wherein the scheduling information of the MCCH update indication information comprises: a multiple, information of a start radio frame of a sending period of the MCCH update indication information, and information of a subframe of the sending period of the MCCH update indication information, wherein (the multiple)×(the sending period of the MCCH update indication information)=a modification period of the MCCH, wherein a system frame number (SFN) of a radio frame carrying the MCCH update indication information is determined by the following formula:

SFN mod (the modification period of the MCCH/the multiple)=offset, where the offset is information of the start radio frame of the sending period of the MCCH update indication information, representing the offset of the start radio frame relative to a radio frame numbering 0, wherein the receiving the MCCH update indication information comprises:
receiving and retrieving control domains of the subframes in the radio frames including the MCCH update indication information.

9. The device according to claim 8, the second receiving unit is further used for:
after the control domains are received and retrieved, obtaining control information of the MCCH update indication information, and obtaining the MCCH update indication information included in data domains of the subframes according to the control information of the MCCH update indication information.

\* \* \* \* \*